(12) United States Patent
Ahn et al.

(10) Patent No.: US 12,552,445 B2
(45) Date of Patent: Feb. 17, 2026

(54) ELECTRIC POWER STEERING APPARATUS

(71) Applicant: HL MANDO CORPORATION, Pyeongtaek-si (KR)

(72) Inventors: Sang Hee Ahn, Gyeonggi-do (KR); Kyung Min Ko, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 699 days.

(21) Appl. No.: 17/944,184

(22) Filed: Sep. 13, 2022

(65) Prior Publication Data

US 2023/0085431 A1    Mar. 16, 2023

(30) Foreign Application Priority Data

Sep. 15, 2021   (KR) .......................... 10-2021-0122882

(51) Int. Cl.
| | | |
|---|---|---|
| *B62D 5/04* | (2006.01) | |
| *B62D 15/02* | (2006.01) | |
| *F16H 37/12* | (2006.01) | |
| *F16H 57/039* | (2012.01) | |
| *F16H 57/02* | (2012.01) | |

(52) U.S. Cl.
CPC ......... *B62D 5/0421* (2013.01); *B62D 15/021* (2013.01); *F16H 37/122* (2013.01); *F16H 57/039* (2013.01); *F16H 2057/02034* (2013.01); *F16H 2057/02082* (2013.01)

(58) Field of Classification Search
CPC ............................ B62D 5/0421; B62D 15/021
USPC .................................................. 180/443, 444
See application file for complete search history.

(56) References Cited

U.S. PATENT DOCUMENTS

2013/0112493 A1*  5/2013  Kim .......................... B62D 3/02
                                                                          180/444

FOREIGN PATENT DOCUMENTS

| CN | 210706892 U | * | 6/2020 |
| JP | 2001349385 A | * | 12/2001 |

\* cited by examiner

*Primary Examiner* — Jacob D Knutson
(74) *Attorney, Agent, or Firm* — WOMBLE BOND DICKINSON (US) LLP

(57) ABSTRACT

An electric power steering apparatus according to the present embodiments comprises an input shaft connected to an steering shaft, a first output shaft coupled to the input shaft, a first gear provided at one end of the first output shaft, a second gear meshed with the first gear, a second output shaft provided with the second gear at one end and having an outer screw groove formed on an outer circumferential surface of a position spaced apart from the second gear in an axial direction and rotating in conjunction with the second gear, and a sliding member having an inner screw groove corresponding to the outer screw groove formed on an inner circumferential surface thereof, coupled to the second output shaft via a ball, and sliding in an axial direction to operate a link connected to vehicle wheels.

18 Claims, 10 Drawing Sheets

ELECTRIC POWER STEERING APPARATUS

CROSS REFERENCE TO RELATED APPLICATION

This application claims the benefit and priority from Korean Patent Application No. 10-2021-0122882, filed in the Republic of Korea on Sep. 15, 2021, the entire contents of which are hereby incorporated by reference for all purposes as if fully set forth into the present application.

BACKGROUND

Technical Field

Embodiments of the present disclosure relate to an electric power steering apparatus, and more particularly, to an electric power steering apparatus that can transmit the amplified steering torque through a reducer even in the case of a truck or bus requiring a relatively large steering force compared to a passenger vehicle, and enhance the driver's convenience by improving the durability of power transmission parts such as ball nuts, ball screws, sector shafts, and housings. In the present embodiments, additional functions such as automatic parking, lane maintenance, driving assistance according to road surface conditions, and autonomous driving control that control the vehicle regardless of the driver's steering intention can be used, thereby enhancing the driver's convenience.

Description of the Related Art

In general, the steering apparatus of a vehicle is a device for changing the direction of the vehicle at the will of the driver. This is a device that assists the driver to advance the vehicle in a desired direction by arbitrarily changing the rotational center of the front wheel of the vehicle.

On the other hand, a power steering apparatus is a device that allows the vehicle's traveling direction to be easily changed with less force, when the driver operates the steering wheel a booster is used to assist the driver with the steering wheel operation force.

Such a power steering apparatus is largely divided into an electric power steering apparatus (EPS) and a hydraulic power steering apparatus (HPS).

In the hydraulic power steering apparatus, the hydraulic pump connected to the engine's rotating shaft supplies hydraulic oil to the operating cylinder connected to the rack bar so that the driver can steer with a small force. As the piston of the working cylinder supplied with hydraulic oil moves, it assists the steering operation force.

On the other hand, the electric power steering apparatus is a steering system that assists the steering wheel's operating force with the power of the motor because it has a motor instead of a hydraulic pump and an operating cylinder.

However, in the case of trucks or buses that require relatively large steering force compared to passenger cars, hydraulic power steering apparatus is used for the reason that high output is required. Since the hydraulic power steering apparatus does not have an electronic control device, there is a problem that functions such as automatic parking, lane keeping, and autonomous driving using the electronic control device cannot be used.

Therefore, even in the case of trucks or buses that require a relatively large steering force compared to passenger cars, the need to enable automatic parking, lane keeping, and autonomous driving using electronic control devices is emerging. And there is a need for improving the driver's convenience by transmitting the amplified steering torque and improving the durability of the power transmission part.

SUMMARY

Embodiments of the present disclosure may provide an electric power steering apparatus that controls the vehicle regardless of the driver's will to steer, even in the case of a truck or a bus requiring a relatively large steering force compared to a passenger car. Embodiments of the present disclosure may provide an electric power steering apparatus that can increase the convenience of the driver by enabling additional functions such as automatic parking, lane maintenance, driving assistance according to road surface conditions, and autonomous driving control to be used.

In addition, the purpose of embodiments of the present disclosure is not limited thereto, and other objects not mentioned will be clearly understood by those skilled in the art from the following description.

An electric power steering apparatus according to the embodiments of the present disclosure may comprise an input shaft connected to an steering shaft, a first output shaft coupled to the input shaft, a first gear provided at one end of the first output shaft, a second gear meshed with the first gear, a second output shaft provided with the second gear at one end and having an outer screw groove formed on an outer circumferential surface of a position spaced apart from the second gear in an axial direction and rotating in conjunction with the second gear, and a sliding member having an inner screw groove corresponding to the outer screw groove formed on an inner circumferential surface thereof, coupled to the second output shaft via a ball, and sliding in an axial direction to operate a link connected to vehicle wheels.

According to embodiments of the present disclosure, it is possible to provide an electric power steering apparatus that controls the vehicle regardless of the driver's will to steer, even in the case of a truck or a bus requiring a relatively large steering force compared to a passenger car. According to embodiments of the present disclosure, it is possible to provide an electric power steering apparatus that can increase the convenience of the driver by enabling additional functions such as automatic parking, lane maintenance, driving assistance according to road surface conditions, and autonomous driving control to be used.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
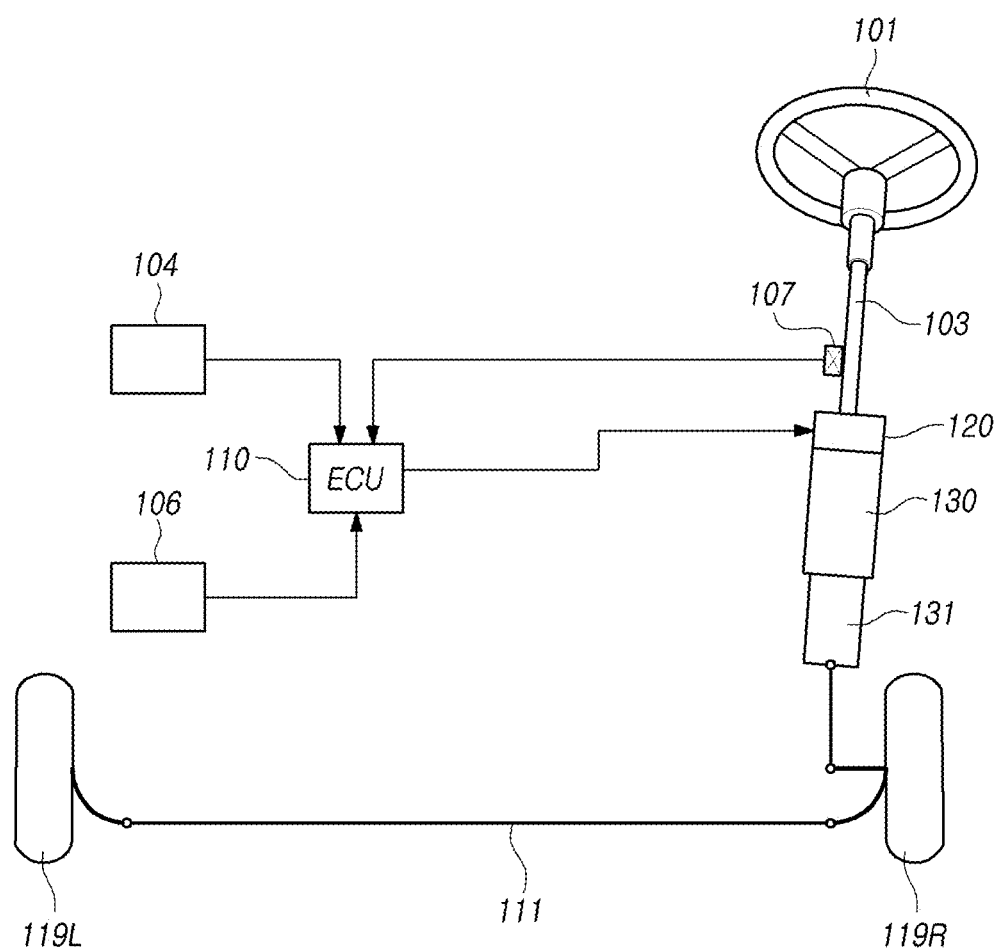
FIG. 1 is a configuration diagram schematically showing an electric power steering apparatus according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
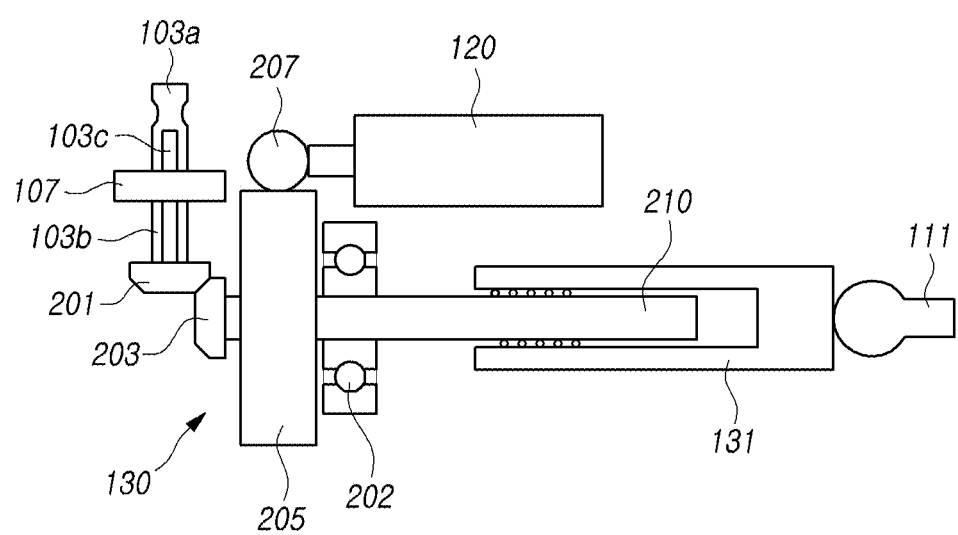
FIGS. 2 to 4 are block diagrams showing some of the electric power steering apparatus according to embodiments of the present disclosure.
Figure 3:
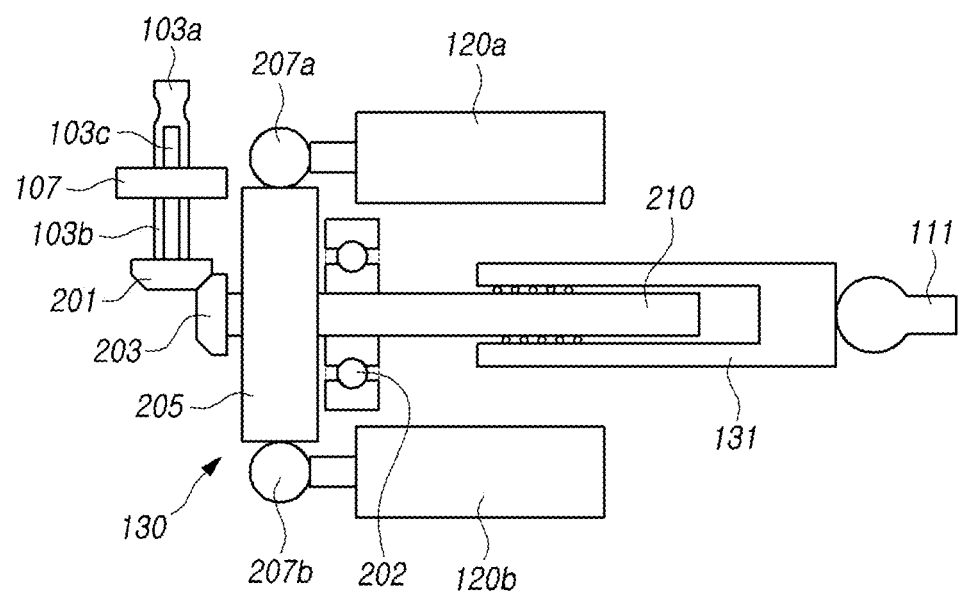
Figure 4:
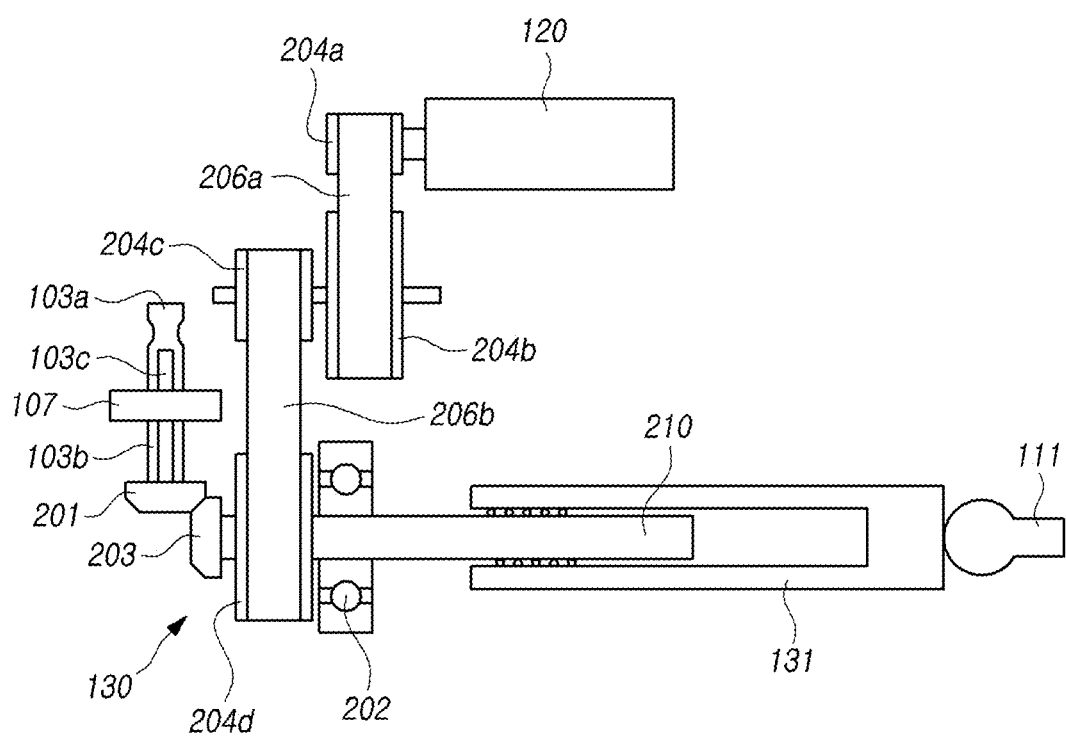
Figure 5:
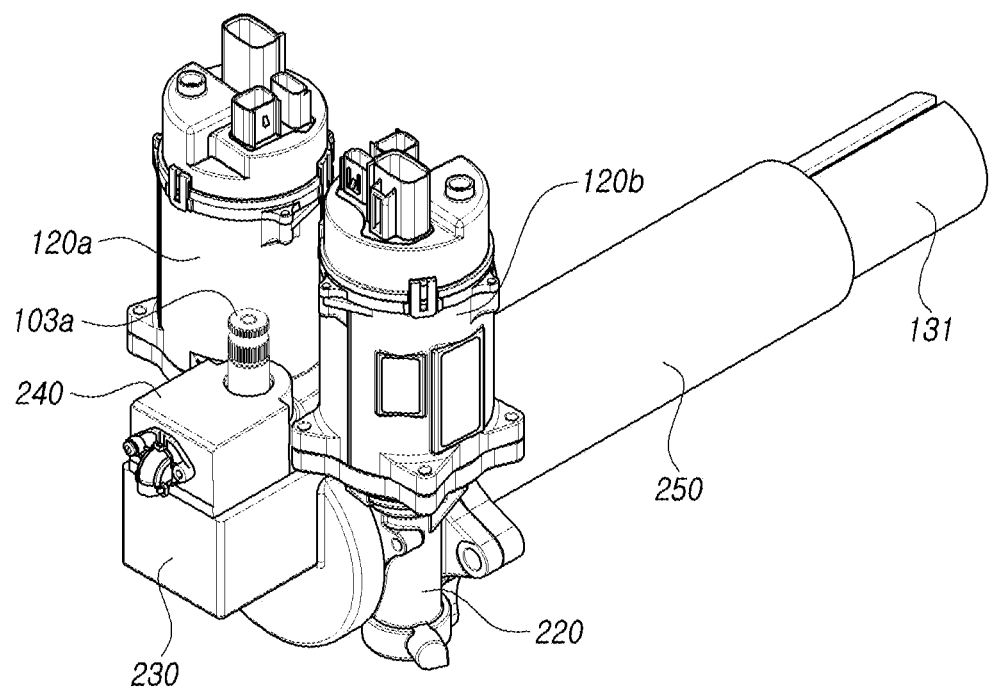
FIG. 5 is a perspective view showing some of the electric power steering apparatus according to embodiments of the present disclosure.
Figure 6:
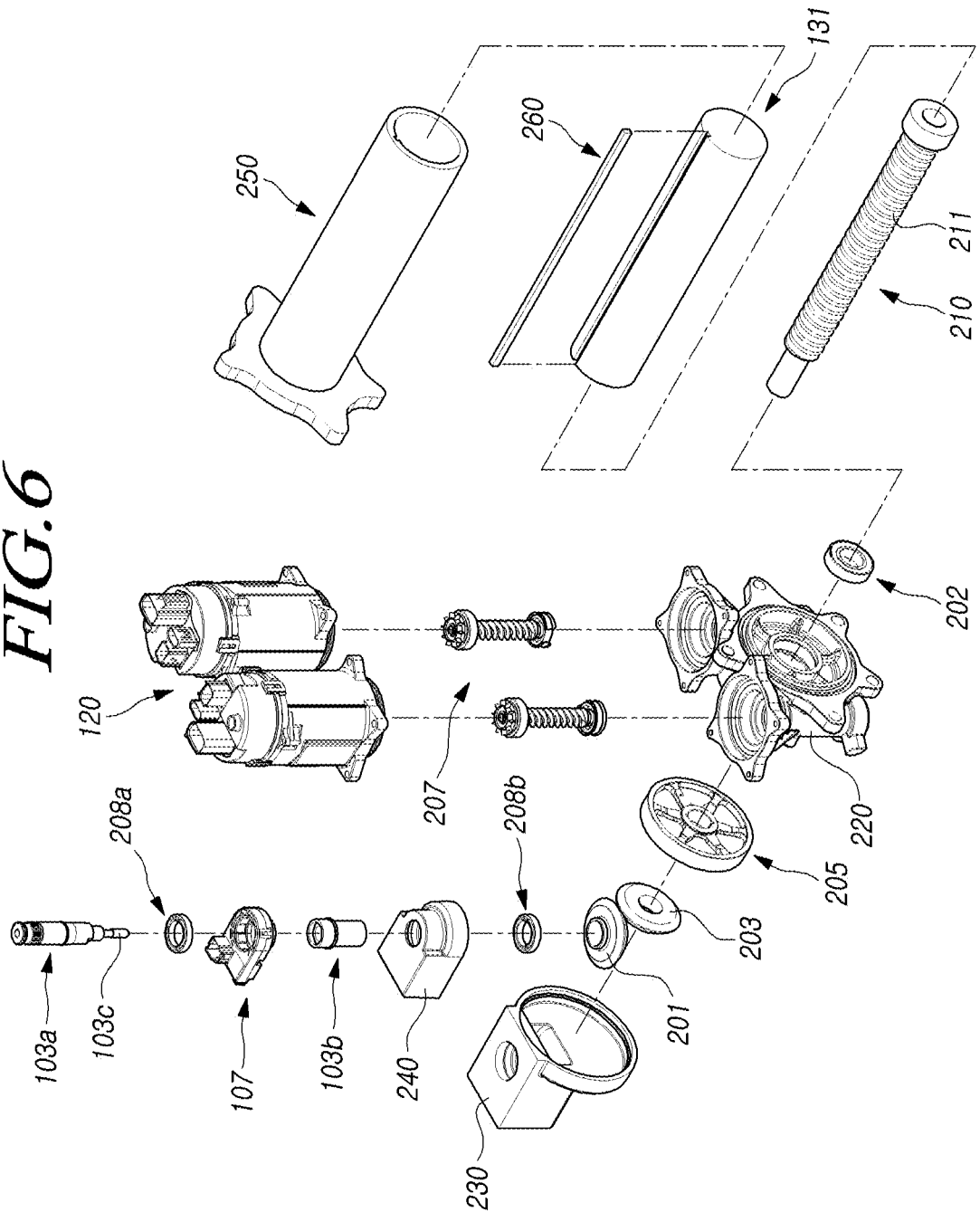
FIGS. 6 and 7 are exploded perspective views showing some of the electric power steering apparatus according to embodiments of the present disclosure.
Figure 7:
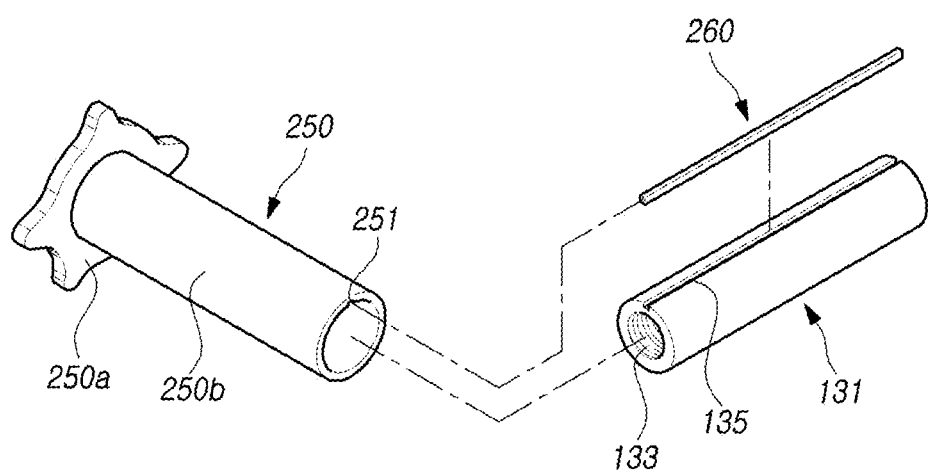
Figure 8:
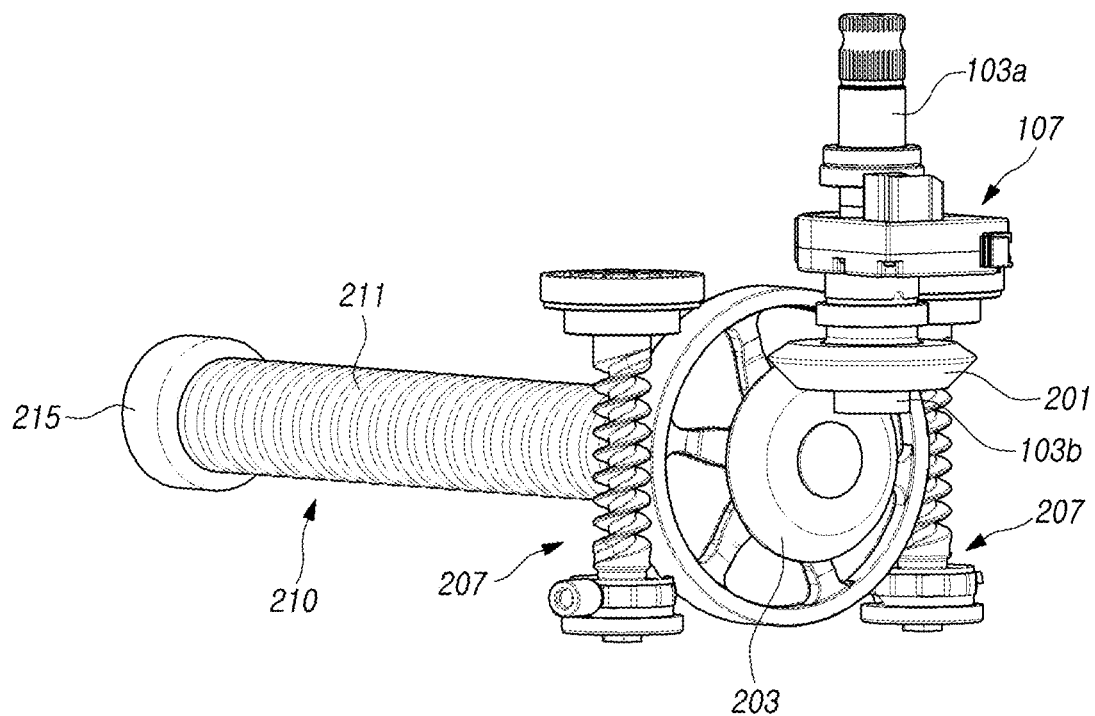
FIG. 8 is a perspective view showing some of the electric power steering apparatus according to embodiments of the present disclosure.
Figure 9:
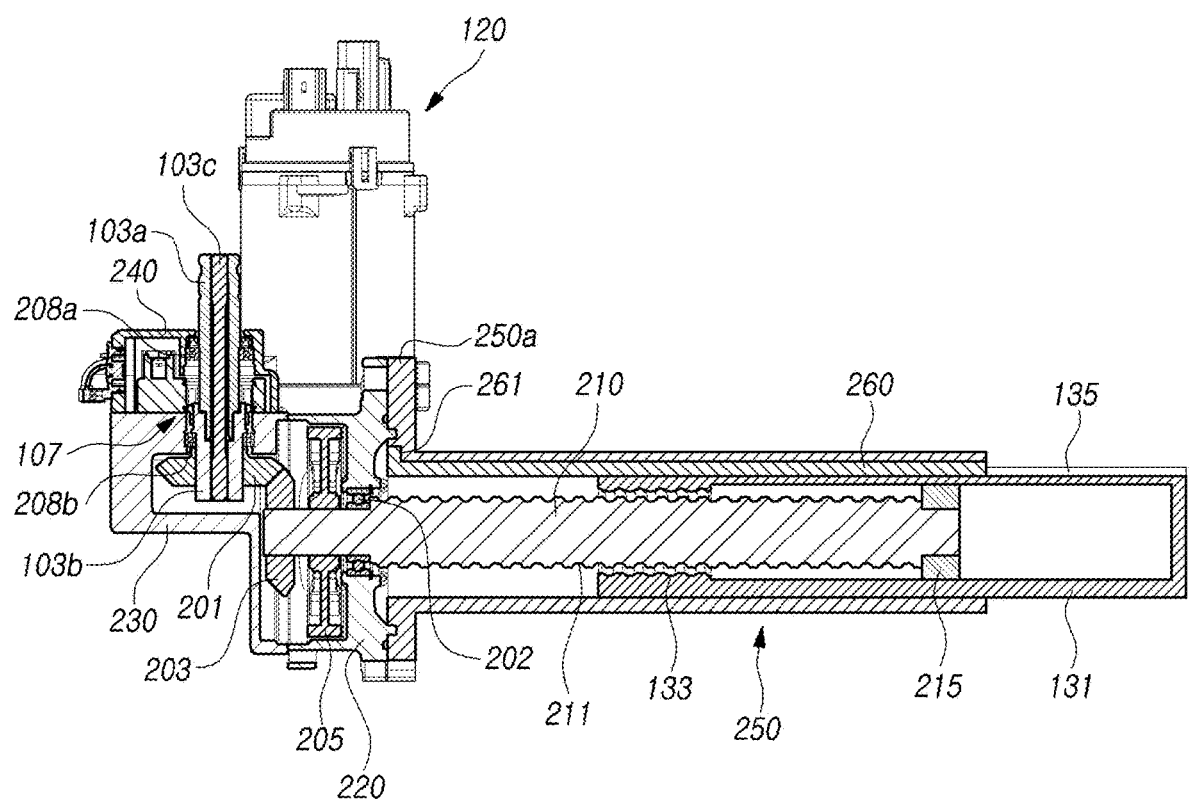
FIG. 9 is a cross-sectional view showing some of the electric power steering apparatus according to embodiments of the present disclosure.
Figure 10:
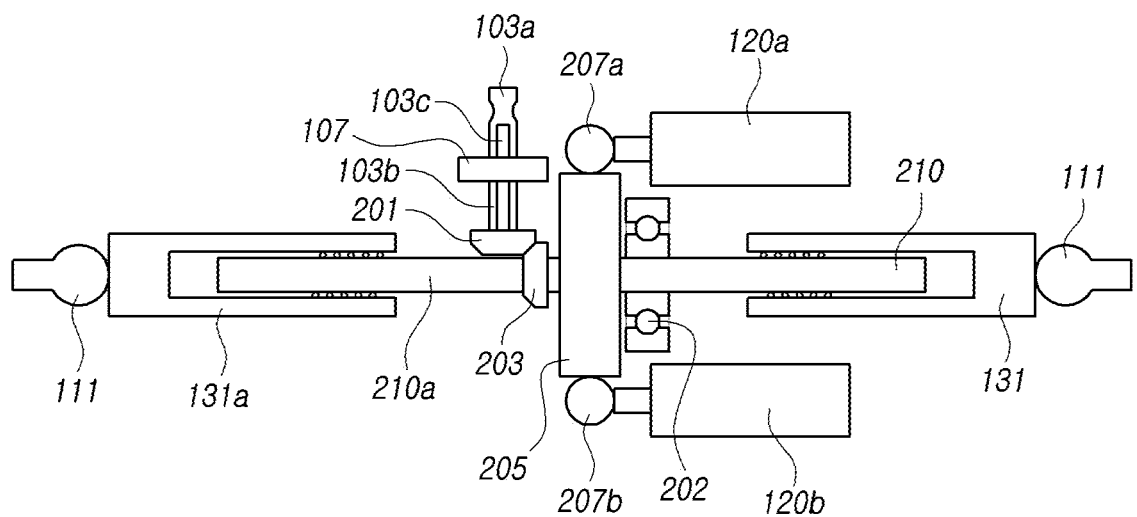
FIG. 10 is a configuration diagram showing an electric power steering apparatus according to embodiments of the present disclosure.

FIG. 1 is a configuration diagram schematically showing an electric power steering apparatus according to embodiments of the present disclosure, FIGS. 2 to 4 are block diagrams showing some of the electric power steering apparatus according to embodiments of the present disclosure, FIG. 5 is a perspective view showing some of the electric power steering apparatus according to embodiments of the present disclosure, FIGS. 6 and 7 are exploded perspective views showing some of the electric power steering apparatus according to embodiments of the present disclosure, FIG. 8 is a perspective view showing some of the electric power steering apparatus according to embodiments of the present disclosure, FIG. 9 is a cross-sectional view showing some of the electric power steering apparatus according to embodiments of the present disclosure, FIG. 10 is a configuration diagram showing an electric power steering apparatus according to embodiments of the present disclosure.

An electric power steering apparatus according to the embodiments of the present disclosure may comprise an input shaft 103a connected to an steering shaft 103, a first output shaft 103b coupled to the input shaft 103a, a first gear 201 provided at one end of the first output shaft 103b, a second gear 203 meshed with the first gear 201, a second output shaft 210 provided with the second gear 203 at one end and having an outer screw groove 211 formed on an outer circumferential surface of a position spaced apart from the second gear 203 in an axial direction and rotating in conjunction with the second gear 203, and a sliding member 131 having an inner screw groove 133 corresponding to the outer screw groove 211 formed on an inner circumferential surface thereof, coupled to the second output shaft 210 via a ball, and sliding in an axial direction to operate a link 111 connected to vehicle wheels 119L and 119R.

In the electric power steering apparatus according to embodiments of the present disclosure, an torque angle sensor 107 is provided on a steering shaft 103 connected to a steering wheel 101. When the driver manipulates the steering wheel 101, the torque angle sensor 107 that detects it transmits electrical signals to an electronic control device 110. The electronic control device 110 transmits an operation signal value to a motor 120.

The electronic control device 110 controls the operating current value of the motor 120 based on the electric signal values input from the torque angle sensor 107 and the electric signal values received from other sensors mounted on the vehicle.

In the drawings in embodiments of the present disclosure, for convenience of explanation, an torque angle sensor 107, a vehicle speed sensor 102, a motor rotation angle sensor 106 are briefly illustrated as an example. However, various radars, lidars, camera image sensors, etc. for transmitting steering information to the electronic control device 110 may be provided, and detailed descriptions of these various sensors will be omitted.

The motor 120 may be configured in plurality, and the sliding member 131 is operated through the reducer 130 to steer the both vehicle wheels 119L and 119R through the link 111 connected thereto.

The input shaft 103a connected to the steering shaft 103 is coupled to the first output shaft 103b, and the first gear 201 is provided at one end of the first output shaft 103b.

Here, when the steering shaft 103 is integrally provided according to the engine room layout of the vehicle, the steering shaft 103 itself becomes the input shaft 103a. Also, the steering shaft 103 is bent by a universal joint or the like and two or more are provided, the steering shaft 103 may be connected to the input shaft 103a.

A second gear 203 meshed with the first gear 201 is provided at one end of the second output shaft 210 interlocked with the first output shaft 103b. An outer screw groove 211 is formed on an outer circumferential surface of the position spaced apart from the second gear 203 in the axial direction, and is rotated in conjunction with the second gear 203 when the steering shaft 103 rotates.

The sliding member 131 coupled to the second output shaft 210 has an inner screw groove 133 corresponding to the outer screw groove 211 on the inner circumferential surface. Therefore the sliding member 131 is coupled to the second output shaft 210 via a ball and slides in the axial direction, and steering is performed by operating the link 111 connected to the wheel.

Here, the first output shaft 103b and the second output shaft 210 may be vertically disposed, and the first gear 201 and the second gear 203 may be formed as bevel gears.

The second output shaft 210 is provided with a reducer 130 that transmits the rotational force of the motor 120. The reducer 130 may include a worm shaft 207 coupled to a shaft of the motor 120, and a worm wheel 205 coupled between the second gear 203 of the second output shaft 210 and the outer screw groove 211 and meshed with the worm shaft 207.

The worm wheel 205 coupled to the second output shaft 210 receives a steering force from the motor in addition to the steering force transmitted through the input shaft 103a, as shown in FIG. 2, a worm shaft 207 is coupled to one side of the worm wheel 205 to transmit the driving force of the motor 120. As shown in FIG. 3, a first motor 120a and a second motor 120b are provided, and a first worm shaft 207a and a second worm shaft 207b may be coupled to both sides of the worm wheel 205, respectively.

The first worm shaft 207a is coupled to the shaft of the first motor 120a, and the second worm shaft 207b is coupled to the shaft of the second motor 120b. The worm wheel 205 is coupled between the second gear 203 of the second output shaft 210 and the outer screw groove 211, and a first worm shaft 207a and a second worm shaft 207b are engaged with one side and the other side opposite to each other in the radial direction on the outer circumferential surface of the worm wheel 205.

That is, the motor 120 may be composed of a first motor 120a and a second motor 120b in order to prevent the motor 120 from becoming incapable of steering when an error occurs.

In addition, in some cases, when either one of the first motor 120a and the second motor 120b becomes inoperable or a greater steering force is required, the electronic control device 110 may generate a higher output to the other motor.

That is, the electronic control device 110 compares the signal detected by the motor rotation angle sensor 106 provided in each of the first motor 120a and the second motor 120b to detect the operating state with preset data, when it is determined that one of the motors is inoperable or has an error, the electronic control device 110 may increase or decrease the output of the other motor accordingly.

In addition, as shown in FIG. 4, the driving force of the motor 120 may be transmitted to the second output shaft 210 through the reducer 130 including a plurality of pulleys and belts.

In this case, the reducer 130 includes an input pulley 204a coupled to a shaft of the motor 120, a first pulley 204b connected to the input pulley 204a and a first belt 260a, a second pulley 204c coaxially coupled to the first pulley 204b, and an output pulley 204d coupled between the second gear 203 and the outer screw groove 211 and connected to the second pulley 204c and a second belt 206b.

That is, the output pulley 204d is coupled to the position where the worm wheel 205 is coupled, and the driving force of the motor 120 may be transmitted to the output pulley 204d through the input pulley 204a, the first belt 206a, the first pulley 204b, the second pulley 204c, the second belt 206b coupled to the motor shaft.

That is, the driving force of the motor 120 may be transmitted to the second output shaft 210 through the worm wheel 205 and the worm shaft 207, pulleys and a belts, and the like. Hereinafter, a case in which one motor is provided and the worm shaft 207 is coupled to the worm wheel 205 will be described.

The worm shaft 207 and the worm wheel 205 are embedded in a gearbox housing 220 and the first support member 202 for supporting the rotation of the second output shaft 210 is coupled between an inner circumferential surface of the gearbox housing 220 and the outer circumferential surface of one end of the second output shaft 210.

Then, a sliding support member 215 is coupled between an inner circumferential surface of the sliding member 131 and an outer circumferential surface of an end of the second output shaft 210 to support the rotation of the second output shaft 210.

Accordingly, the motor 120, the worm shaft 207 and the worm wheel 205 that transmit the driving force of the motor 120 are safely protected from external impact and the driving force of the motor 120 is accurately transmitted to the second output shaft 210.

A cylindrical sliding housing 250 for supporting the sliding of the sliding member 131 is provided on an outer periphery of the sliding member 131, and a coupling flange 250a is provided at one end of the sliding housing 250, so that the coupling flange 250a is coupled to the gearbox housing 220 by a fastening member.

Accordingly, the sliding housing 250 does not sag and is firmly fixed while maintaining coaxiality with the sliding member 131 and the second output shaft 210.

A guide groove 135 formed in an axial direction is provided on an outer circumferential surface of the sliding member 131 and the sliding housing 250 is provided with a rotation preventing portion 260 inserted into the guide groove 135 to prevent rotation of the sliding member 131.

Accordingly, when the second output shaft 210 rotates, the sliding member 131 does not rotate but slides in the axial direction.

The rotation preventing portion 260 may radially protrude from an inner circumferential surface of the sliding housing 250 so as to be integrally formed with the sliding housing 250 and be elongated in the axial direction.

In addition, as shown in FIGS. 6 and 7, the rotation preventing portion 260 may be separately formed and coupled to the sliding housing 250. In this case, a fixing groove 251 formed in the axial direction is formed in the sliding housing 250, and the rotation preventing portion 260 may be inserted into the fixing groove 251 and the guide groove 135 to be fixed.

When the anti-rotation part 260 is separately formed and coupled in this way, as shown in FIG. 9, one end of the rotation preventing portion 260 is provided with a bent portion 261 coupled to the coupling flange 250a of the sliding housing 250 to be fixed to the sliding housing 250.

Accordingly, when the sliding member 131 slides in the axial direction, it is possible to prevent the rotation preventing portion 260 from slipping in the fixing groove 251 and the guide groove 135.

The input shaft 103a and the first output shaft 103b are hollow and the torsion bar 103c is coupled to the inner space. The torque angle sensor 107 is coupled to the outer periphery of the input shaft 103a to measure the steering rotation direction and torque, and transmit it to the electronic control device 110.

A sensor housing 230 surrounding the first gear 201, the second gear 203, the first output shaft 103b, and the torque angle sensor 107 is coupled to one side of the gearbox housing 220 and fixed.

A second support member 208b is coupled between an inner circumferential surface of the sensor housing 230 and an outer circumferential surface of the first output shaft 103b to support the rotation of the first output shaft 103b.

A sensor cover 240 surrounding the input shaft 103a and the torque angle sensor 107 is coupled and fixed to one side of the sensor housing 230.

The third support member 208a is coupled between an inner circumferential surface of the sensor cover 240 and an outer circumferential surface of the input shaft 103a to support the rotation of the input shaft 103a.

Accordingly, the input shaft 103a and the first output shaft 103b are rotated without being twisted on the same axis, and the first gear 201 and the second gear 203 are coupled at the correct position.

In the electric power steering apparatus according to the present embodiments, the sliding member 131 may be coupled to both sides of the second output shaft 210 according to the layout of the engine room of the vehicle.

That is, as shown in FIG. 10, an end of the second output shaft 210 is extended toward the front end of the second gear 203 to form an extension portion 210a, and another sliding member 131a may be coupled to the extension portion 210a.

In this case, the sliding member 131 on one side and the sliding member 131a on the other side are disposed between the links 111, and when the second output shaft 210 is rotated, the sliding member 131 on one side and the sliding member 131a on the other side move in the same direction while operating the links 111 to steer.

According to embodiments of the present disclosure, it is possible to provide an electric power steering apparatus that controls the vehicle regardless of the driver's will to steer, even in the case of a truck or a bus requiring a relatively large steering force compared to a passenger car. And, it is possible to provide an electric power steering apparatus that can increase the convenience of the driver by enabling additional functions such as automatic parking, lane maintenance, driving assistance according to road surface conditions, and autonomous driving control to be used.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An electric power steering apparatus comprising:
    an input shaft connected to a steering shaft;
    a first output shaft coupled to the input shaft;
    a first gear provided at one end of the first output shaft;
    a second gear meshed with the first gear;
    a second output shaft provided with the second gear at one end and having an outer screw groove formed on an outer circumferential surface of a position spaced apart from the second gear in an axial direction and rotating in conjunction with the second gear; and
    a sliding member having an inner screw groove corresponding to the outer screw groove formed on an inner circumferential surface thereof, coupled to the second output shaft via a ball, and sliding in the axial direction to operate a link connected to vehicle wheels.

2. The electric power steering apparatus of claim 1, wherein the first gear and the second gear are formed as bevel gears.

3. The electric power steering apparatus of claim 1, wherein the second output shaft is provided with a reducer for transmitting the rotational force of a motor, wherein the reducer comprises:
    a worm shaft coupled to a shaft of the motor; and
    a worm wheel coupled between the second gear and the outer screw groove and engaged with the worm shaft.

4. The electric power steering apparatus of claim 3, wherein a gearbox housing in which the worm shaft and the worm wheel are embedded is provided, and a first support member is coupled between an inner circumferential surface of the gearbox housing and the outer circumferential surface of one end of the second output shaft.

5. The electric power steering apparatus of claim 4, wherein a sliding support member is coupled between the inner circumferential surface of the sliding member and the outer circumferential surface of an end of the second output shaft.

6. The electric power steering apparatus of claim 4, wherein a cylindrical sliding housing for supporting the sliding of the sliding member is provided on an outer peripheral side of the sliding member.

7. The electric power steering apparatus of claim 6, wherein a coupling flange is provided at one side of the sliding housing and coupled to the gearbox housing by a fastening member.

8. The electric power steering apparatus of claim 6, wherein a guide groove formed in the axial direction is provided on an outer circumferential surface of the sliding member, and a rotation preventing portion inserted into the guide groove to prevent rotation of the sliding member is provided in the sliding housing.

9. The electric power steering apparatus of claim 8, wherein the rotation preventing portion protrudes in a radial direction from an inner circumferential surface of the sliding housing and is formed in the axial direction.

10. The electric power steering apparatus of claim 8, wherein a fixing groove formed in the axial direction is formed in the sliding housing, and the rotation preventing portion is inserted into the fixing groove and the guide groove.

11. The electric power steering apparatus of claim 10, wherein one end of the rotation preventing portion is provided with a bent portion coupled to a coupling flange of the sliding housing, and the bent portion is fixed to the sliding housing.

12. The electric power steering apparatus of claim 4, wherein a torque angle sensor is coupled to an outer peripheral side of the input shaft.

13. The electric power steering apparatus of claim 12, wherein a sensor housing surrounding the first gear, the second gear, the first output shaft, and the torque angle sensor is coupled to one side of the gearbox housing.

14. The electric power steering apparatus of claim 12, wherein a second support member is coupled between an inner circumferential surface of a sensor housing and an outer circumferential surface of the first output shaft.

15. The electric power steering apparatus of claim 14, wherein a sensor cover surrounding the input shaft and the torque angle sensor is coupled to one side of the sensor housing.

16. The electric power steering apparatus of claim 15, wherein a third support member is coupled between an inner circumferential surface of the sensor cover and an outer circumferential surface of the input shaft.

17. The electric power steering apparatus of claim 1, wherein the second output shaft is provided with a reducer for transmitting the rotational force of a first motor and a second motor, wherein the reducer comprises:

a first worm shaft coupled to a shaft of the first motor;

a second worm shaft coupled to a shaft of the second motor; and a worm wheel coupled between the second gear and the outer screw groove, the first worm shaft and the second worm shaft meshing to one side and another side of an outer circumferential surface.

18. The electric power steering apparatus of claim 1, wherein the second output shaft is provided with a reducer for transmitting the rotational force of a motor, wherein the reducer comprises:

an input pulley coupled to a shaft of the motor;

a first pulley connected to the input pulley and a first belt;

a second pulley coaxially coupled to the first pulley; and an output pulley coupled between the second gear and the outer screw groove and connected to the second pulley and a second belt.

* * * * *